United States Patent
Breindel et al.

(10) Patent No.: US 11,501,003 B2
(45) Date of Patent: *Nov. 15, 2022

(54) SYSTEMS AND METHODS TO CONTROL PUBLICATION OF USER CONTENT IN A VIRTUAL WORLD

(71) Applicant: Tilia, Inc., San Francisco, CA (US)

(72) Inventors: Matthew A. Breindel, San Francisco, CA (US); Donald N. Kjer, Pleasant Hill, CA (US); Richard Benjamin Trent Nelson, Concord, CA (US); Avery Lauren Orman, Cambridge, MA (US); Jeffery Blaine Petersen, San Diego, CA (US)

(73) Assignee: TILIA, INC., San Francisco, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/017,488

(22) Filed: Sep. 10, 2020

(65) Prior Publication Data

US 2020/0410111 A1 Dec. 31, 2020

Related U.S. Application Data

(63) Continuation of application No. 16/364,016, filed on Mar. 25, 2019, now Pat. No. 10,776,496, which is a
(Continued)

(51) Int. Cl.
*H04L 29/06* (2006.01)
*G06F 21/57* (2013.01)
(Continued)

(52) U.S. Cl.
CPC ............ *G06F 21/577* (2013.01); *A63F 13/00* (2013.01); *A63F 13/352* (2014.09);
(Continued)

(58) Field of Classification Search
None
See application file for complete search history.

(56) References Cited

U.S. PATENT DOCUMENTS 8,225,317 B1 7/2012 Chiueh et al.
8,433,656 B1 4/2013 Evans et al.
(Continued)

OTHER PUBLICATIONS

Kouril, Daniel et al. Cloud-based testbed for simulation of cyberattacks. 2014 IEEE Network Operations and Management Symposium (NOMS), https://ieeexplore.ieee.org/stamp/stamp.jsp?tp=&arnumber=6838298 (Year: 2014).*
(Continued)

*Primary Examiner* — Jeremiah L Avery
(74) *Attorney, Agent, or Firm* — Greenberg Traurig

(57) ABSTRACT

A computing system and method to implement a three-dimensional virtual reality world having user created virtual objects. During the creation of a virtual object, a user of the virtual reality world identifies components and/or resources of the virtual object, such as a mesh model defining the shape of the virtual object, an image specifying the appearance of the virtual object, and a script defining the run time behavior of the virtual object. The computer system examines the components and/or resources duration the creation process of the virtual object to detect and/or address security threats and/or performance hurdles. Before the approval of the publication of the virtual object in the virtual world, the computer system performs a simulation of the rendering of the virtual object to detect security threats and evaluate performance impacts.

20 Claims, 8 Drawing Sheets

Related U.S. Application Data continuation of application No. 15/594,457, filed on May 12, 2017, now Pat. No. 10,282,551.

(51) Int. Cl.

| | | |
|---|---|---|
| *G06F 21/53* | (2013.01) | |
| *A63F 13/00* | (2014.01) | |
| *G06T 19/00* | (2011.01) | |
| *A63F 13/655* | (2014.01) | |
| *A63F 13/63* | (2014.01) | |
| *A63F 13/69* | (2014.01) | |
| *A63F 13/358* | (2014.01) | |
| *A63F 13/352* | (2014.01) | |
| *A63F 13/71* | (2014.01) | |

(52) U.S. Cl.
CPC ............ *A63F 13/358* (2014.09); *A63F 13/63* (2014.09); *A63F 13/655* (2014.09); *A63F 13/69* (2014.09); *A63F 13/71* (2014.09); *G06F 21/53* (2013.01); *G06T 19/00* (2013.01); *G06F 2221/034* (2013.01)

(56) References Cited

U.S. PATENT DOCUMENTS

| | | | |
|---|---|---|---|
| 8,832,784 B2* | 9/2014 | Budko | G06F 21/53 709/227 |
| 9,292,971 B2 | 3/2016 | Lima et al. | |
| 9,559,993 B2 | 1/2017 | Palakovich et al. | |
| 10,282,551 B2 | 5/2019 | Breindel et al. | |
| 10,726,611 B1 | 7/2020 | Court | |
| 10,776,496 B2 | 9/2020 | Breindel et al. | |
| 2008/0004093 A1* | 1/2008 | Van Luchene | G07F 17/32 463/1 |
| 2008/0004119 A1 | 1/2008 | Van Luchene et al. | |
| 2008/0062167 A1* | 3/2008 | Boggs | G06T 19/00 345/419 |
| 2008/0163379 A1 | 7/2008 | Robinson et al. | |
| 2009/0156907 A1* | 6/2009 | Jung | A63F 13/10 600/300 |
| 2009/0157481 A1* | 6/2009 | Jung | A61B 5/378 709/205 |
| 2009/0165140 A1 | 6/2009 | Robinson et al. | |
| 2010/0023889 A1 | 1/2010 | Bussani et al. | |
| 2010/0138455 A1* | 6/2010 | Alewine | A63F 13/25 715/706 |
| 2010/0177117 A1 | 7/2010 | Finn et al. | |
| 2012/0136793 A1 | 5/2012 | Valin et al. | |
| 2014/0162598 A1* | 6/2014 | Villa-Real | H04M 1/66 455/411 |
| 2014/0304505 A1 | 10/2014 | Dawson | |
| 2015/0050997 A1 | 2/2015 | Suzman et al. | |
| 2016/0099892 A1 | 4/2016 | Palakovich et al. | |
| 2017/0173262 A1 | 6/2017 | Veltz | |
| 2017/0195353 A1 | 7/2017 | Taylor et al. | |
| 2017/0337813 A1 | 11/2017 | Taylor | |
| 2017/0346851 A1 | 11/2017 | Drake | |
| 2018/0330096 A1 | 11/2018 | Breindel et al. | |
| 2018/0330110 A1 | 11/2018 | Nelson et al. | |
| 2019/0220604 A1 | 7/2019 | Breindel et al. | |

OTHER PUBLICATIONS

Mahajan, Varun; Peddoju, Sateesh K. Integration of network intrusion detection systems and honeypot networks for cloud security. 2017 International Conference on Computing, Communication and Automation (ICCCA). https://ieeexplore.ieee.org/stamp/stamp.jsp?tp=&arnumber=8229911 (Year: 2017).*

Richardson, T. Preventing Attacks on Back-End Servers using Masquerading/Honeypots. Seventh ACIS International Conference on Software Engineering, Artificial Intelligence, Networking, and Parallel/Distributed Computing, https://ieeexplore.ieee.org/stamp/stamp.jsp?tp=&arnumber=1640721 (Year: 2006).*

Ban, Yameng; Zhao, Yuepeng. The Security Research of Massively Multiplayer Online Role Playing Games. 2012 International Conference on Computer Science and Service System, https://ieeexplore.ieee.org/stamp/stamp.jsp? p=&arnumber=6394792 (Year: 2012).

Cobourne, Shelia et al. "Avatar Voting in Virtual Worlds", 2014 5th International Conference on Information and Communication Systems (ICICS). https://ieeexplore.ieee.org/stamp/stamp.jsp?tp=&arnumber=6841982 (Year: 2014).

Inoue, Daisuke et al. Malware Behavior Analysis in Isolated Miniature Network for Revealing Malware's Network Activity. 2008 IEEE International Conference on Communications, https://ieeexplore.ieee.org/stamp/stamp.jsp?p=&arnumber=4533366 (Year: 2008).

Mitterhofer, Stefan et al. Server-Side Bot Detection in Massively Multi player Online Games. IEEE Security & Privacy, vol. 7, Issue: 3 (Year: 2009).

Pandey, Anjali; Srivastava, Shashank. An Approach for Virtual Machine Image Security. 2014 International Conference on Signal Propagation and Computer Technology (ICSPCT 2014). https://ieeexplore.ieee.org/stamp/stamp.jsp?p=&arnumber=6884997 (Year: 2014).

Park, Sang-Kil et al. "Supporting Interoperability to Heterogeneous IDS in Secure Networking Framework", 9th Asia-Pacific Conference on Communications, https://ieeexplore.ieee.org/stamp/stamp.jsp?tp=&arnumber=1274479 (Year 2003).

Shan, Zhiyong et al. Malware Clearance for Secure Commitment of OS-Level Virtual Machines. IEEE Transactions on Dependable and Secure Computing, vol. 10, Issue: 2. https://ieeexplore.ieee.org/stamp/stamp.jsp?p=&arnumber=6365643 (Year: 2013).

Wang, Shanshan et al. TrafficAV: An Effective and Explainable Detection of Mobile Malware Behavior Using Network Traffic. 2016 IEEE/ACM 24th International Symposium on Quality of Service (IWQoS) (Year: 2016).

* cited by examiner

SYSTEMS AND METHODS TO CONTROL PUBLICATION OF USER CONTENT IN A VIRTUAL WORLD

RELATED APPLICATIONS

The present application is a continuation application of U.S. patent application Ser. No. 16/364,016, filed Mar. 25, 2019, issued as U.S. Pat. No. 10,776,496 on Sep. 15, 2020, which is a continuation application of U.S. patent application Ser. No. 15/594,457, filed May 12, 2017, issued as U.S. Pat. No. 10,282,551 on May 7, 2019, both entitled "Systems and Methods to Control Publication of User Content in a Virtual World," the entire disclosures of which applications are hereby incorporated herein by reference.

The present application is related to U.S. patent application Ser. No. 15/594,358, filed May 12, 2017, published as U.S. Pat. App. Pub. No. 2018/0330110 on Nov. 15, 2018, and entitled "Systems and Methods to Control Access to Components of Virtual Objects," the entire disclosure of which application is hereby incorporated herein by reference.

FIELD OF THE TECHNOLOGY

At least some technologies disclosed herein relate to information security and access control in general and more specifically, but not limited to, access to virtual objects in a three-dimensional virtual world.

BACKGROUND

Computer technologies have developed for the presentation of three-dimensional virtual worlds to users of computing devices.

For example, a virtual world can be hosted on a set of server computers (e.g., secondlife.com). Client programs or viewers can be installed on user computers for connections to the server computers and for user participation in the virtual world. Users of a virtual world can be presented as the residents of the virtual world in the form of avatars. The resident avatars can travel in the three-dimensional virtual world, explore the three-dimensional virtual world, meet other resident avatars for virtual social activities, and communicate with each other via voice, instant messaging, text chart, local chat, and/or group chat. The avatars may build, create, shop and trade virtual objects and services with each other in the three-dimensional virtual world.

Avatars of a virtual world may take various forms, such as human, animal, vegetable, etc. In a virtual world, users may customize various aspects of their avatars and may choose to resemble the users themselves in appearance as they are in the real world. A user may have multiple avatars, but use only one avatar at a time for participation in the virtual world.

In a virtual world, a user of a client program or viewer of the virtual world can use conventional input devices to control the activities of the avatar that represents the user in the virtual world, such as keyboards and pointer control device (e.g., mouse, touch pad, track ball, joystick, and touch screen). The view of the virtual world as currently being seen by the avatar at its current position and orientation can be presented on a display device, such as a computer monitor, a display of a notebook computer, and a touch screen of a mobile device.

A virtual world may allow the users to create virtual objects in the virtual worlds and obtain virtual objects created by others to modify and/or assemble them to create new virtual objects. A creator of a virtual object may want a level of control on the usage, distribution, and/or replication of the virtual object by other users, such as the use of the virtual object and its components in the creation of new virtual objects. The creator may want to upgrade/update of virtual object when the updates/upgrades of the component objects used in the virtual object becomes available.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
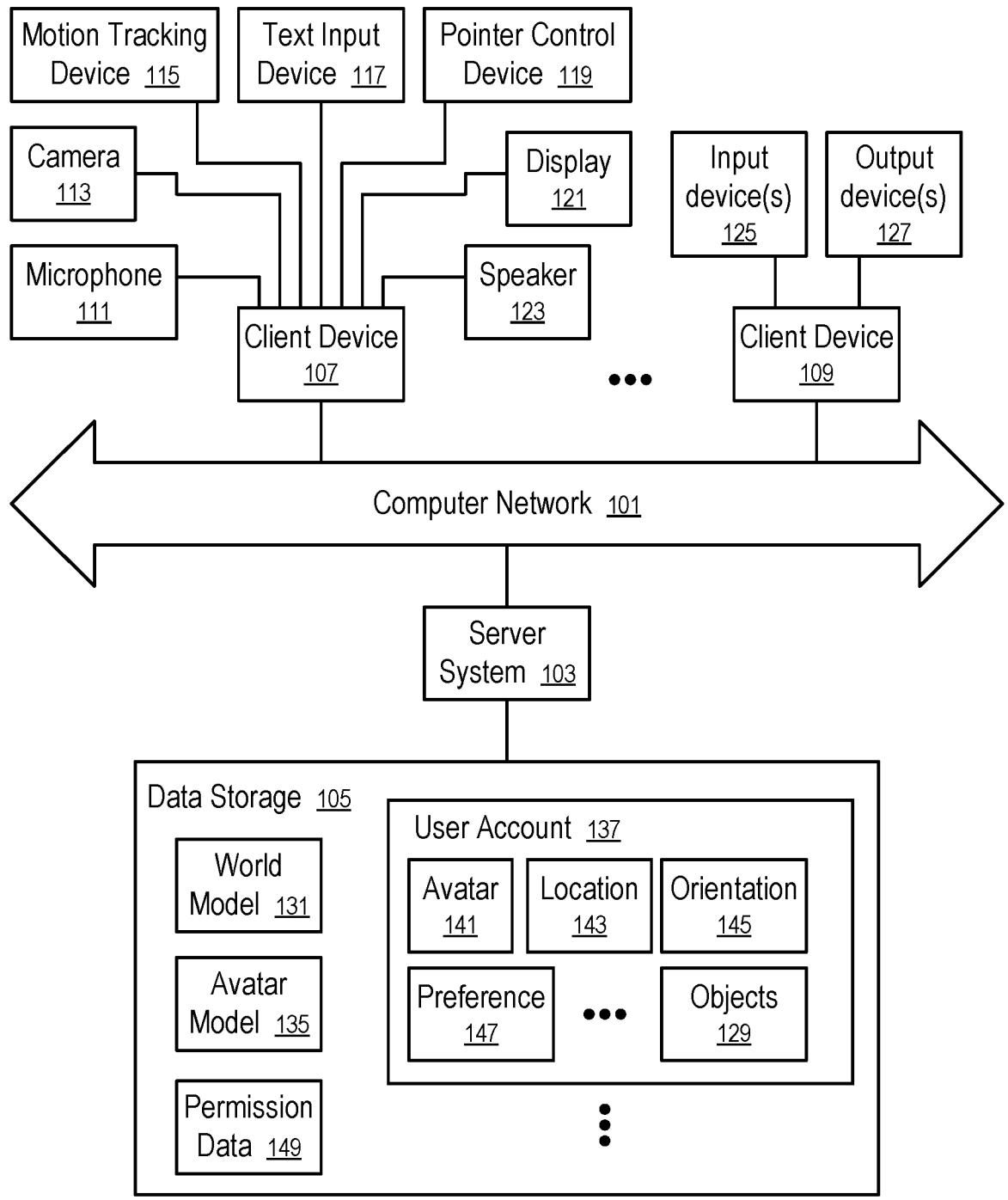
FIG. 1 shows a computer system in which techniques of the present disclosure can be used.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

A virtual world may allow its users to create virtual objects to enrich the virtual world. For example, a first user may create a virtual wheel; a second user may use instances of the virtual wheel in constructing a virtual vehicle; and a third user may modify the virtual vehicle to create an improved vehicle. In such a scenario, the virtual wheel created by the first user may be replicated as instances by the second user, used as components of the virtual vehicle created by the second user, and reused, as components being integrated in the virtual vehicle, in the creation of the improved vehicle made by the third user. The virtual wheels, the virtual vehicle, and the improved vehicle may have instances used by other users with or without modification. The virtual objects are presented as part of the virtual world. Thus, the user created objects enriches the virtual world over time. Further, when the first user improves the virtual wheel to provide an updated/upgraded virtual wheel, it is desirable to update/upgrade at least some of the instances of the virtual wheel, as well as other virtual objects that use the virtual wheel as components, such as the virtual vehicle, the improved virtual vehicle, and their instances.

In the virtual world, perfect instances of a virtual object can be easily "manufactured" via data replication and/or reference without users making significant efforts. However, the creation of unique virtual objects requires significant contributions from the creators of the virtual objects. Thus, the creators may want to control the distribution and use of their creations.

It is a challenge to efficiently and effectively track the permissions of virtual objects, as the virtual objects are replicated with or without modification and/or integrated into new creations.

The present disclosure provides data structure techniques to address such a challenge.

In one aspect, a blueprint of virtual object is used to identify the construction of the virtual object from its component resources. A provenance node of the virtual object is used to track the creator of the virtual object, and the parameters for access control related to the usage of the virtual object and/or its component resources. A provenance tree, formed by linking the provenance node of the virtual object to the respective provenance nodes of the component resources, specifies the access control parameters of the entire component tree of the virtual object. Access controls can be prescribed by creators of virtual objects and applied efficiently, even when some of the virtual objects are extracted from other virtual objects as component resources and built into new virtual objects.

In another aspect, a platonic object is used to provide a version-neutral representation of different versions of virtual object. An instance of a virtual object acquired by a user is represented by a reference to the platonic object, which allows the efficient tracking of upgradable relations among multiple versions of virtual object.

A typical avatar in a three-dimensional virtual world has a position and orientation. A user device provides inputs to control the position and orientation of the avatar in the virtual world to simulate the experience of traveling in the virtual world by presenting the virtual world from the point of view of the position and orientation of the avatar. The virtual reality system (e.g., a server system and/or the client program/viewer) renders a view of the virtual world based on position and orientation of the avatar and presents the view of the virtual world on the user device. The view of the virtual world includes other avatars in the field of view of the avatar, and other virtual objects, such as virtual building, parks, theaters, streets, etc.

Within the view of the virtual world, the virtual reality system may identify a set of objects or avatars that may be of particular interest to the avatar. For examples, when an avatar speaks to a nearby listening avatar, the listening avatar may become a point of interest for the gaze of the speaking avatar. For examples, when an avatar listens to a nearby speaking avatar, the speaking avatar may become a point of interest for the gaze of the listening avatar. For examples, when an avatar speaks to a group of avatars, the avatars in the group may become potential points of interest for the gaze of the speaking avatar. A computer system hosting the virtual world renders a view of the virtual world from the point of the gaze of the avatar and the present the view to the user of the avatar, as if the user of the avatar is viewing the virtual world according to the gaze of the avatar.

FIG. 1 shows a computer system in which techniques of the present disclosure can be used.

In FIG. 1, a server system (103) has a data storage (105) storing a three dimensional world model (131) and avatar models (135). The virtual world represented by the model (131) may or may not resemble a part of the real world on the Earth. Client devices (107, . . . , 109) can be used to access the virtual world via the server system (103). For example, the server system (103) may generate a view of the virtual world and provide the view to a client device (109) for display. For example, the server system (103) may extract a portion of the world model (131) and the avatar model (135) relevant for the display of the view for the client device (109); and the client device (109) constructs a view of the portion of the virtual world from the data extracted and provided by the server system (103).

In FIG. 1, a user of the server system (103) has a user account (137) stored in the data storage (105). The user account (137) hosts information such as the identification of an avatar (141) of the user in the virtual world, the location (143) and orientation (145) of the avatar (141) in the virtual world, preferences (147) of the user, such as the personalization parameters of the avatar (141).

After a user of a client device (109) is authenticated for the authorization to access the virtual world via the user account (137), the input devices (125) of the client device (109) provide user inputs to control the location (143) and orientation (145) of the avatar (141) of the user; and the server system (103) provides a data stream to the client device (109) according to the location (143) and the orientation (145) of the avatar (141) such that the client device (109) presents, on the output device (127), the view of the virtual world that is perceived to be seen in the eyes of the avatar (141). The view of the virtual world simulates the experience of a user in the virtual world at the location (143) and orientation (145) of the avatar (141); and the display of the virtual world on the client device (109) corresponds to the presentation of a video stream captured by a virtual camera at a location (143) and orientation (145) of the avatar (141). Since the view is in the eyes of the avatar (141), the view generally does not include the avatar (141) itself and more specifically the eyes of the avatar (141). However, the avatar (141) itself and the eyes of the avatar (141) can be in the views of other avatars that are in the vicinity of the avatar (141).

Examples of the input devices (125) include a text input device (117) (such as a keyboard, a virtual keyboard implemented on a touch screen, text input implemented via speech recognition), a pointer control device (e.g., arrow keys of a keyboard, a mouse, a track ball, a touch pad, a touch screen, a joystick), a motion tracking device (e.g., motion sensors attached to a head-mount display, data glove, mobile phones, personal media player, mobile computing device, game controller), a digital camera (113), a microphone (111), etc.

Examples of the output devices (127) include a display (121) (e.g., a computer monitor, a touch screen, a head-mount display, a virtual reality headset) and a speaker (123) (or earphone, headphone).

In some instances, a client device (109) has an eye-tracking capability (e.g., via a head-mount camera (113) that capture video images of the eyes of the user, a front facing camera (113) of a smart phone, a tablet computer, a mobile device), which makes it possible to control the eye movements of an avatar (141) and/or the field of view of the avatar (141) independent of the movement of the location (143) and orientation (141) of the avatar (141) as a whole.

In some instances, when the client device (109) does not have an eye-tracking capability, the system is configured to present eye movements based on predictions, eye movement models, preferences (147), and other inputs from other devices (e.g., 117, 119). For example, predetermined patterns of eye movements are animated based on predetermined models. Thus, the experiences of the user of the avatar (141) can be improved, as well as the experiences of other users interacting with the avatar (141) of the user in the virtual world.

The system of FIG. 1 can also be used for the presentation of augmented reality, where virtual representations of users in the form of avatars are projected into a view of a real world. The avatars may have the form of a human and/or be generated based on images of the users of the avatars so that the avatars resemble the users in real world.

FIG. 1 illustrates the use of a centralized server system (103) to host the virtual world represented by the world model (131). In other implementations, the virtual world may be hosted on a distributed computer network.

In FIG. 1, the user account (137) may include a number of virtual objects (129), such as virtual vehicles, virtual televisions, virtual telephones, etc. Some of the virtual objects (129) may be created by other users of the virtual world and acquired by the user of the account (137); and some of the virtual objects (129) may be created by the user of the account (137) using tools and/or building blocks offered by the server system (103) and/or virtual objects created and offered by users of other accounts.

In FIG. 1, the data storage (105) stores the permission data (149) that controls the access to virtual objects (e.g., 129), instances of which may be acquired by some users of the server system (103), and/or modified or used to create new virtual objects which may be further modified or used in the creation of other virtual objects.

In one implementation, a typical virtual object (129), like an avatar (141), has a position and orientation, a shape, a size, and a visual representation in the virtual world. When the virtual object (129) is within the field of view of the avatar (141), the virtual object (129) is presented as part of the virtual world at the position of the virtual object (129) in the virtual world. Thus, the avatar (141) may approach and interact with the virtual object (129). When the virtual object (129) is acquired by the avatar (141), a copy or instance of the virtual object (129) is created at a location selected by the avatar (141).

Some of the virtual objects (129) may be decorative items in the virtual world (e.g., virtual clothing). Some of the virtual objects (129) may have pre-programmed functions that allow an avatar (141) to interact with the virtual objects (129). For example, a virtual vehicle may have a control that allows an avatar to drive it around in the virtual reality world.

Figure 2:
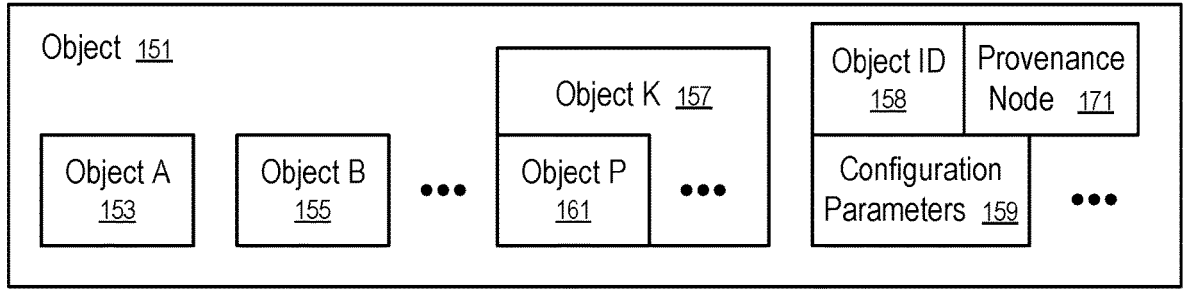
FIG. 2 shows a data structure of a virtual object to facilitate access control according to one embodiment.

FIG. 2 shows a data structure of a virtual object to facilitate access control according to one embodiment. For example, the data structure of FIG. 2 can be used to specify the structure and access control of one of the objects (129) created by the user of the account (137) illustrated in FIG. 1.

In FIG. 2, the object (151) includes a blueprint that specifies the construction of the object (151) from a set of objects (153, 155, . . . , 157) that are used as resources or components. The resource objects (153, 155, . . . , 157) can be placed at predetermined positions in space relative to each other according to the design of the blueprint. The blueprint may specify the ways the resource objects (153, 155, . . . , 157) are connected to each other and the configurations of the resource objects (153, 155, . . . , 157) within the object (151).

A resource object (e.g., 157) itself may be constructed from a plurality of objects (e.g., 161); and the blueprint of the object (151) may specify the use of some of the objects (e.g., 161) extracted from the resource object (e.g., 157) in the construction of the object (151). Some of the objects (e.g., 161) of the resource object (e.g., 157) may be not used in the object (151); and such unused objects may or may not be allowed to be used outside the object (151).

As an example, the resource object (157) may be used as a resource bundle that allows a creator of the object (151) to selectively use some of the objects (e.g., 161) in the resource bundle to create the object (151). Unused portions of the resource bundle may or may not be allowed to be used in the creation of another object separate from the object (151).

The resource object (157) may have a blueprint identifying a particular ways to connect its resource objects (e.g., 161); and in constructing the object (151), the creator of the object (151) may use some of the connections of a subset of the objects (161), discard or modify other connections, and/or discard or replace other objects. Thus, the blueprint of the resource object (157) may be partially used in the blueprint of the object (151).

In FIG. 2, the configuration parameters (159) of the object (151) specify the way the object (151) is configured and/or constructed from its resource objects (153, 155, . . . , 157). The configuration parameters (159) may include user-customizable parameters and non-customizable parameters. User-customizable parameters allow an end-user of the object (151) to personalize an instance of the object (151) without creating a new object. Non-customizable parameters define the character and property of the object (151). Adjustments to any of the non-customizable parameters lead to the creation of a new object; the user who makes the adjustments becomes the creator of the new object; and the object (151) is a resource of the new object.

In FIG. 2, the object (151) has an object ID (158) that identifies the object (151). Instances of the object (151) can be created with a reference to the object ID (158) so that the blueprint of the object (151) can be used for the rendering of the instances (e.g., based on the location and orientation of the instance in the virtual world, and the user-customizable parameters specified for the respective instances).

Figure 4:
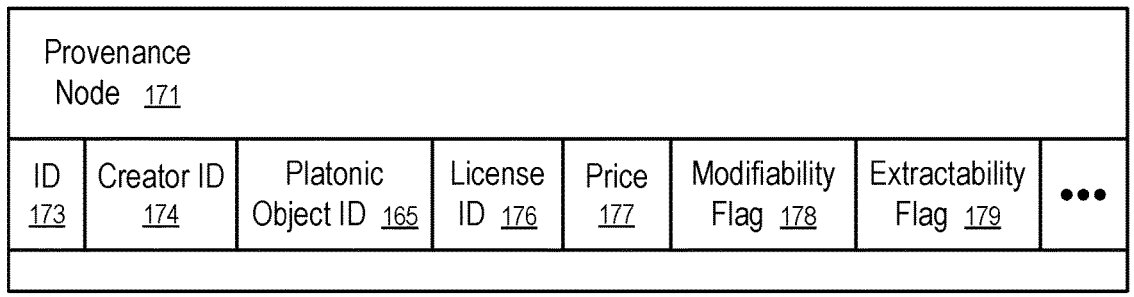
FIG. 4 illustrates a provenance node of a virtual object to facilitate access control according to one embodiment.

In FIG. 2, the object (151) includes a provenance node (171) that specifies the access control parameters. The creator of the object (151) can use the control parameters to specify the conditions for the use the object (151), whether the object (171) is modifiable, and whether the resource objects (153, 155, . . . , 157) can be separately extracted for the creation of different new objects. FIG. 4 provides an example of the provenance node (171).

Figure 3:
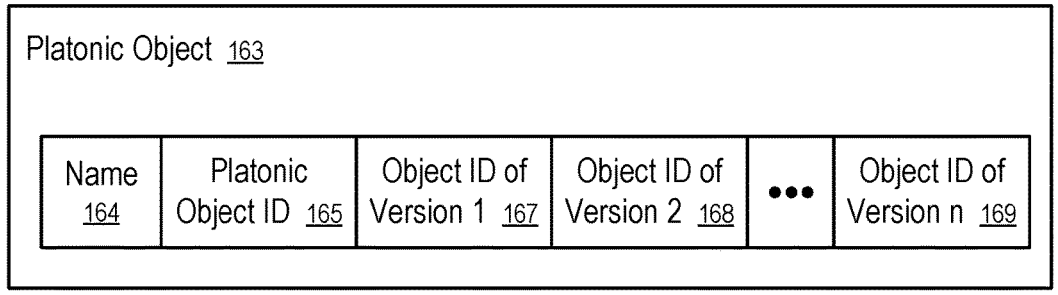
FIG. 3 illustrates a platonic object to facilitate access control according to one embodiment.

FIG. 3 illustrates a platonic object to facilitate access control according to one embodiment. The platonic object (163) of FIG. 3 is a version-neutral representation of different object versions to facilitate the control of access to updates and upgrades.

In FIG. 3, the platonic object (163) includes a name (164) of the object (163), an ID (165) of the platonic object (163) for efficient and unique reference, and a list of object IDs (e.g., 167, 168, . . . , 169) of multiple versions of the platonic object (163). When a new version is created, the object ID of the new version is added to the list. The objects identified by the object IDs (e.g., 167, 168, . . . , 169) have the specific blueprints for the construction and implementation of the versions of the platonic object (163).

For example, a virtual world may allow the creator of an object (151) to make incremental improvements of the object (151) and thus create different versions. The objects (e.g., 151) of different versions are represented by the same platonic object (163). Instances of the object (151) corresponding to a particular version can be generated as an instance of the platonic object (163) having the corresponding version, such that access to the instance leads easily to the different versions of the platonic object (163).

For example, when a creator initially constructs the object (151) from a set of resource objects (153, 155, . . . , 157), a first version of the object (151) is created with the object ID (158); and a platonic object (163) is created to provide a version-neutral representation of the object (151) and its potential successors/updates/upgrades. The platonic object (163) includes it name (164), a platonic object ID (165), and an identification of the object ID (158) in the field for the object ID of version 1 (167). When the creator improves the object (151) to create a successor object corresponding to the next version of the platonic object (163), the platonic object (163) is updated to include the object ID of the successor object in the field of object ID of version 2 (168). Thus, the platonic object (163) provides efficient access to both the object (151) and its successor.

In some instances, the object IDs (167, 168, . . . , 169) of different versions are stored as an ordered array or a linked list in the platonic object (163) to provide access to a set of objects according to their revision history of evolving from one version to another. In some instances, the platonic object (163) also includes information about compatibility among the versions to facilitate automated update/upgrade to compatible version. The data storage (105) of the server system (103) stores actual objects of different versions (e.g., 151) that contain the blueprints and access control parameters of the actual objects, such that instances of the actual objects can be accessed via the object IDs (167, 168, . . . , 169) provided in the platonic object (163) (e.g., for testing and/or updating/upgrading).

Different instances of different versions of the platonic object (163) can be acquired by users of different accounts (e.g., 137) and be presented in the virtual world according to their respective blueprints and the locations of the instances. When a user obtains an instance of a version of the platonic object (163), the instance is rendered according to the blueprint of the corresponding object (e.g., 151) identified by the object ID specified for the corresponding version.

In some instances, the creator may offer a free update or upgrade of an instance of the platonic object (163) having a version corresponding to the object (151) to a newer version. During the rendering or processing of the instance of the platonic object (163), the server system (103) may automatically update the instance, according to the reference to the new version identified in the list of object IDs stored in the platonic object (163), with or without explicit input from the user. For example, the user may have a preference (147) stored in the user account (137) to accept automatic updates/upgrades. In some instances, the server system (103) may prompt the user to indicate whether or not to update/upgrade, when, e.g., the update/upgrade has a potential incompatibility or requires a cost. In some instances, the server system (103) may allow the user to test the updated/upgraded object before finalizing the update/upgrade of the instance acquired by the user.

When an instance of the platonic object (163) is used as a resource object (e.g., 157) in the blueprint of another object (e.g., 151), the server system (103) may generate an automated notification to the creator of the object (151) about availability of the update/upgrade, such that the creator may test the update/upgrade for the use in the object (151) and determine whether to use the updated/upgraded object (157) for the object (151), and/or to generate an update/upgraded version of the object (151) in view of the available new version of the platonic object (163).

Thus, the use of the platonic object (163) simplifies the processing of object updates/upgrades in a complex environment where multiple versions of an object can coexist in the virtual world stand-alone and being integrated as components in the construction of other objects in the virtual world.

FIG. 4 illustrates a provenance node of a virtual object to facilitate access control according to one embodiment. For example, the structure of the provenance node (171) of FIG. 4 can be used to implement the provenance node (171) of the object (151) illustrated in FIG. 2.

In FIG. 4, the provenance node (171) has an ID (173) that uniquely identifies the provenance node (171) among provenance nodes of various objects (e.g., 151). In some instances, a reference to the provenance node ID (173) by an object (151 or 163) or an instance of the object (151 or 163) is used to connect the object (151 or 163) to the access control parameters specified in the provenance node (171).

In FIG. 4, the provenance node (171) has a creator ID (174) that identifies the identity of the object creator (e.g., the user who specifies the blueprint of the object (151) to which the provenance node (171) is attached). The object creator has the privilege to adjust the parameters specified in the provenance node (171), such as a license ID (176), a price (177) of the object (171) for which the provenance node (171) is specified, a modifiability flag (178) of the object (171), an extractability flag (179) of the object (171), etc. Users other than the creator do not have the privilege to adjust the provenance node (171).

In FIG. 4, the provenance node (171) includes a platonic object ID (165) that identifies the platonic object (163) of the object (151) for which the provenance node (171) is specified. Thus, given an object (151) that is a specific version of the platonic object (163), the server system (103) can extract the platonic object ID (165) from its provenance node (171) and check the version history of the platonic object (163) identified by the platonic object ID (165).

For example, when the user of the account (137) acquires the object (151), the server system (103) may use the provenance node (171) of the object (151) to identify the platonic object (163) through the platonic object ID (165) specified in the provenance node (171) and create an instance of the platonic object ID (165) in the user account (137), together with an identification of the version of the instance. Subsequently, during the rendering or presentation of the instance of the platonic object ID (165) in the user account (137), the server system (103) determines, based on the list of objects of different versions identified in the platonic object (163), whether the platonic object ID (165) has an updated/upgraded version. Thus, the update/upgrade can be performed just in time for the presentation of the instance in the user account (137). The update or upgrade can be performed in some instances automatically without user intervention. The update or upgrade can be performed in some instances after a test and/or inspection of the updated/upgraded version of the platonic object (163) by the user of the user account (137).

In FIG. 4, the license ID (176) is used to identify a set of license terms and conditions of the object (151) for which the provenance node (171) is specified. A rule engine of the server system (103) can be programmed to enforce the terms and conditions of the object (151).

In FIG. 4, the price (177) specified in the provenance node (171) of the object (151) identifies the amount a purchaser is required to pay (e.g., using a virtual current, or other types of resources) in order to acquire an instance of the version of the platonic object (163) implemented via the object (151). The resource objects (153, 155, . . . , 157) have their respective provenance nodes to specify their creators and prices. The sum of the prices required by the creators of the resource objects (153, 155, . . . , 157) (and their resources) that are created by users other than the creator identified by the creator ID (174) of the provenance node (171) of the object (151) is the cost to the creator in making and selling an instance of the object (151); and the difference between the price and the sum is the net income derived from the sale for the creator (or loss, if the price is too low, e.g., in a form of incentive, charity, donation, distribution).

For example, after a sale of an instance of the object (151), the server system (103) charges the buyer of the instance according to the price (177) specified in the provenance node (171) of the object (151). The object (151) may be sold stand-alone, or as a resource object in another object that uses the object (151) in its blueprint. Since the sale of the instance of the object (151) automatically effectuates the sale of the instances of the resource objects (153, 155, . . . , 157), the server system (103) uses portions from the income generated from the sale of the instance of the object (151) according to the price (177) to purchase the instances of the resource objects (153, 155, . . . , 157) from the respective creators of the resource objects (153, 155, . . . , 157) according to the prices and create IDs specified in the provenance nodes of the resource objects (153, 155, . . . , 157). The process can be performed recursively or iteratively to pay all creators involved in the construction of the object (151). The creator of the object (151), as identified by the creator ID (174) of the provenance node (171) of the object (151), obtains the balance between the price (177) and the sum of the amounts used to purchase the instances of the resource objects (e.g., 153, 155, . . . , 157) (and their resource objects (e.g., 161)).

Since the server system (103) automatically performs the instance acquisition according to the tree of provenance nodes (171) involved in the object (151), it is not necessary for the creator of the object (151) to pre-purchase the instances of the resource objects (e.g., 153, 155, . . . , 157) to create an inventory for "manufacturing" of the instances of the object (151). Thus, the inventory management of the virtual objects are greatly simplified. At the time of the sale of an instance of the object (151), the server system (103) automatically acquires the required instances, via data replication and/or reference, and provides corresponding credits to the respective creators of the resource components in the blueprint hierarchy of the object (151), in accordance with the creator IDs and prices specified in the provenance nodes of the respective resource objects (and their resource objects and so on).

The modifiability flag (178) of the provenance node (171) of the object (151) indicates whether a user, different from the creator of the object (151) (as identified by the creator ID (165)), is allowed to make modifications to an instance of the object (151) acquired by the user.

When the modifiability flag (178) is in a state that prohibits modifications, the user may use the instance of the object (151) as a whole, without changing the blueprint of the object (151). The user may connect the object (151) to other objects to make a new object. The user may transform the object (151) as a whole, attach other objects to it via joints, or wire in additional parameter nodes to the content of the object (151). However, the user is not allowed to add contents to the object (151), remove contents from the object (151), and/or edit the contents of the object (151). In some instances, the user may set user-customizable parameters of the object (151).

When the modifiability flag (178) is in a state that allows modifications, the user is allowed to change the blueprint of the object (151) to create a new object, with or without the use of additional resource objects. For example, the user may add contents to the object (151), remove contents from the object (151), and/or edit the contents of the object (151), including non-customizable parameters. In the blueprint of the new object created by the user, the object (151) is identified as a resource.

The extractability flag (178) of the provenance node (171) of the object (151) indicates whether the resource objects (e.g., 153, 155, . . . , 157) of the object (151) can be taken out of the context of the object (151) and used elsewhere.

For example, if the virtual wheels of a virtual car are extractable, the user of the virtual car may extract the virtual wheels and use elsewhere. However, if the virtual wheels of the virtual car are not extractable, the user may remove the virtual wheel from the virtual car, discard the virtual wheel, and/or add other virtual wheels to the virtual car to make a new virtual car. The user may remove the virtual wheel and repurpose the virtual wheel as a decorative item on the virtual car, or not use the virtual wheel removed from the virtual car. However, the user is prevented from adding to an inventory the virtual wheels, extracted from the virtual car, and later using the virtual wheel in a context outside the virtual car.

Figure 5:
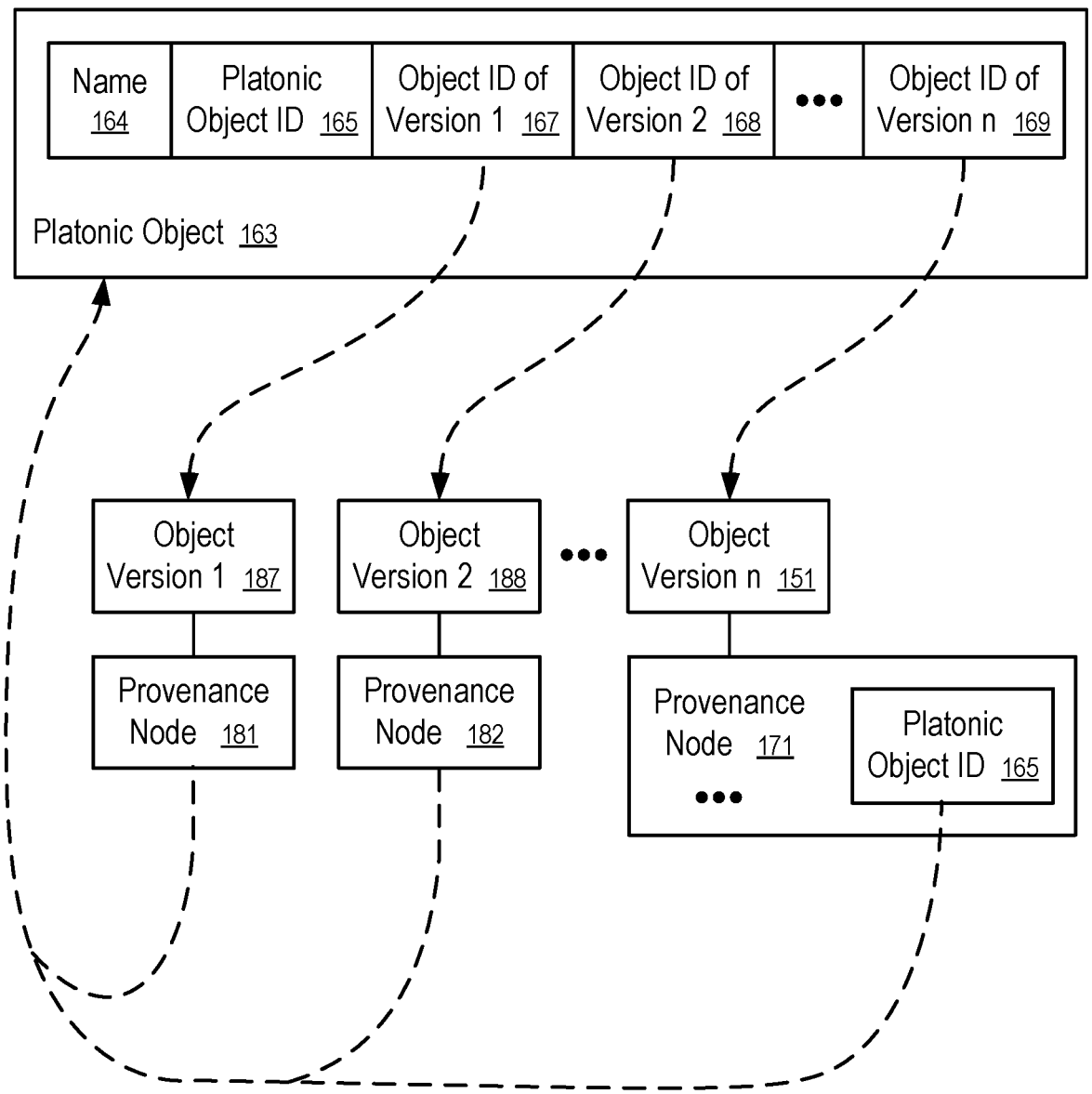
FIG. 5 illustrates a data structure to implement access control for a virtual object having multiple versions according to one embodiment.

FIG. 5 illustrates a data structure to implement access control for a virtual object having multiple versions according to one embodiment. For example, the data structure of FIG. 5 can be implemented using the object (151) of FIG. 2, the platonic object (163) of FIG. 3, and the provenance node (171) of FIG. 4.

In FIG. 5, a plurality of versions of a virtual item can be created as a plurality of objects (187, 188, . . . , 151). Each of the objects (187, 188, . . . , 151) has a blueprint of its construction from one or more resource objects (e.g., 153, 155, . . . , 157, as illustrated in FIG. 2 for the object (151)).

A platonic object (163) has a version history of the virtual item in the form of a list of object IDs (167, 168, . . . , 169). The platonic object (163) represents the virtual item in general. Each of the object IDs (167, 168, . . . , 169) identifies a corresponding one of the objects (187, 188, . . . , 151) of respective versions. Through the reference made via the object IDs (167, 168, . . . , 169), the server system (103) can readily render any version of the platonic object (163) using the blueprint of the respective object (e.g., 187, 188, . . . , or 151).

Each of the objects (187, 188, . . . , 151) of respective versions has a provenance node (e.g., 181, 182, . . . , 171) that specifies the access control parameters of the object (e.g., 181, 182, . . . , 171). The provenance nodes (181, 182, . . . , 171) of the objects (187, 188, . . . , 151) of respective versions have the same platonic object ID (165) that identifies the platonic object (163). Thus, from each object (e.g., 181, 182, . . . , 171) (and its instances), the server system (103) can efficiently determine the complete revision history of the virtual item from the reference made using the platonic object ID (165).

In some instances, some of the objects (187, 188, . . . , 151) of respective versions may optionally share a same provenance node (e.g., 171) (e.g. when such objects have the same access control parameters).

In some instances, the original objects (e.g., 181, 182, . . . , 171) having the blueprints are owned by the creator(s) of the objects. Others may obtain an instance of the platonic object (163) with an indication of the obtained version of the platonic object (163), such that the updates/upgrades can be performed just in time for the use of an instance of the platonic object (163).

In some instances, the platonic object (163) is stored as a centralized record for the version history of the objects (e.g., 181, 182, . . . , 171) of different versions. The platonic object IDs (e.g., 165) provided in the provenance nodes (e.g., 171) of the objects (e.g., 181, 182, . . . , 171) allow the server system (103) to efficiently access the version history and perform the update/upgrade of the instances of the objects (181, 182, . . . , 171) in an automated way.

Figure 6:
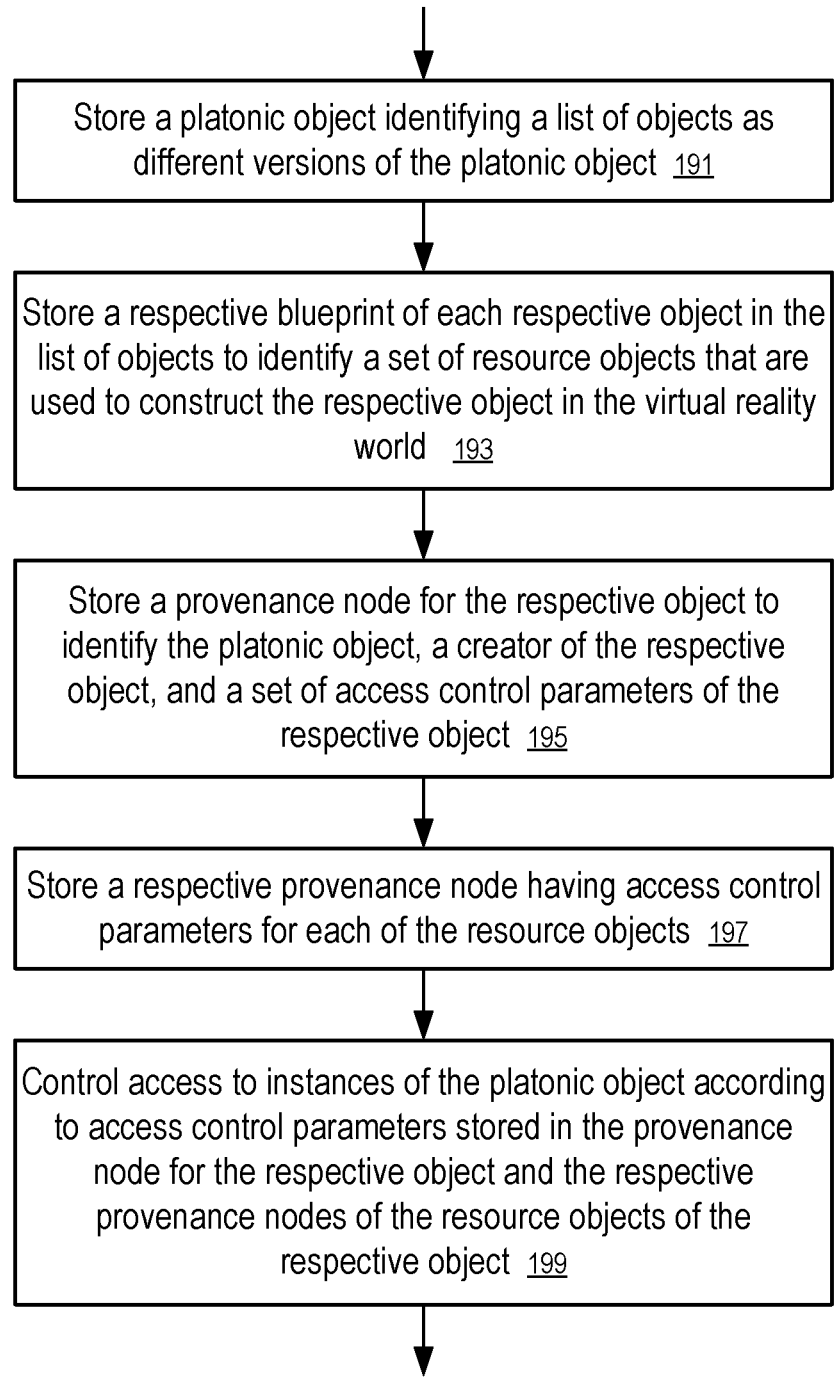
FIG. 6 shows a method to implement access control for virtual objects in a virtual reality world according to one embodiment.

FIG. 6 shows a method to implement access control for virtual objects in a virtual reality world according to one embodiment. For example, the method of FIG. 6 can be implemented using the data structures illustrated in FIGS. 2-5 in a computer system illustrated in FIG. 1.

In FIG. 6, a computer system is configured to: store (191) a platonic object (163) identifying a list of objects (187, 188, . . . , 151) as different versions of the platonic object (163); store (193) a respective blueprint of each respective object (e.g., 151) in the list of objects (187, 188, . . . , 151) to identify a set of resource objects (e.g., 153, 155, . . . , 157) that are used to construct the respective object (151) in the virtual reality world; store (195) a provenance node (171) for the respective object (151) to identify the platonic object (153) (e.g., via the platonic object ID (165), a creator (e.g., via the creator ID (174)) of the respective object (151), and a set of access control parameters (e.g., license ID (175), price (177), modifiability flag (178), extractability flag (179)) of the respective object (151); store (197) a respective provenance node having access control parameters for each of the resource objects (e.g., 153, 155, . . . , 157); and control (199) access to instances of the platonic object (163) according to access control parameters stored in the provenance node (171) for the respective object (151) and the respective provenance nodes of the resource objects (153, 155, . . . , 157) of the respective object (151).

The computer system (e.g., as illustrated in FIG. 1) hosts a three-dimensional virtual reality world and includes a data storage device (105) and a server computer/system (103). The data storage device (105) stores a three-dimensional model (131) of the virtual reality world and avatar models (135) representing residences of the virtual reality world. The data storage device (105) also stores the platonic object (163), the list of objects (187, 188, . . . , 151) as different versions of the platonic object (163), including their blueprints and provenance nodes (e.g., 171). The server computer/system (103) renders the three-dimensional model (131) of the virtual reality world according to view points of avatars (e.g., 141) generated according to the avatar models (135), including instances of the platonic object (151) that are added to the virtual reality world (e.g., by users of the users accounts (e.g., 137)). The server computer/system (103) controls access to the instances of the platonic object (163) according to access control parameters stored in the tree of provenance nodes connected via the references to the list of objects (187, 188, . . . , 151) in the platonic object (163), the references to the resource objects (e.g., 153, 155, . . . , 157) in the blueprint of the respective objects (e.g., 151), and the provenance nodes (e.g., 171) of the objects involved. In some implementations, a provenance node (171) has explicit references to provenance nodes of its component objects (153, 155, . . . , 157) and/or explicit references to the component objects (153, 155, . . . , 157) such that the references from the provenance node (171) to provenance nodes of its component objects (153, 155, . . . , 157) and the provenance nodes of the component objects of the component objects (153, 155, . . . , 157) and so on form a provenance node tree that allows for straightforward application of permissions and version upgrades to sub-trees.

The access to the instances of the platonic object (163) may include the usage of an instance of the respective object (151) in the creation of a virtual object in the virtual reality world, the acquisition of an instance of the respective object (151) by users different from the creator of the respective object (151), and/or the acquisition of instances of resource objects (153, 155, . . . , 157) of the respective object (151) during the acquisition of an instance of the respective object (151).

In general, the respective object (151) has a shape and a size visible in the virtual reality world. A blueprint of the respective object (151) identifies: the positions of its set of resource objects (153, 155, . . . , 157) relative to each other within the respective object (151), and the connections of the resource objects (153, 155, . . . , 157) to each other within the respective object (151).

Access control parameters identified in a provenance node (171) for the respective object (151) includes at least one parameter identifying a permission to modify the blueprint of the respective object (151), such as a permission indicating whether the respective object (151) is modifiable by a user other than the creator in creating a new object, or a permission indicating whether the resource objects (153, 155, . . . , 157) of the respective object (151) are extractable for use in a context outside of the respective object (151) (e.g., whether resource objects (153, 155, . . . , 157) of an instance of the respective object (151) can be used in two or more instances of separate objects).

In one implementation, each instance of an object (e.g., 151) as a particular version of the platonic object (163) is created as an instance of the platonic object (163) having an indication of the particular version. In response to a request to render the instance of the object (e.g., 151) as the particular version of the platonic object (163), the server computer/system (103) dynamically determines, just in time, the availability of another object that serves in the platonic object (163) as the update or upgrade of the object (e.g., 151). If the successor version is available, the server computer/system (103) processes the migration from the instance of the current version of the platonic object (163) to an instance of the next version of the platonic object (163).

For example, the server computer/system (103) may automatically initiate and complete the migration based on compatibility between the current version of the platonic object (163) and the next version of the platonic object (163), in view of a preference of a user of the instance of the current version of the platonic object (163). For example, the user of the user account (137) may provide a preference (147) that allows the automatic update/upgrade based on compatibility and/or a predetermined cost criterion. In some instances, the server computer/system (103) prompts the user to test an instance of the next version of the platonic object (163) and accept the instance of the next version as a replacement of the current version.

When an instance of the platonic object (163) (e.g., the object (151) as a particular version of the platonic object (163)) is used in the construction blueprint of a further virtual object, the migration processing includes the creation of an updated or upgraded version of the further virtual object by replacing the instance of the current version with an instance of the next version. When the server computer/ system (103) presents the updated or upgraded version of the further virtual object to the creator of the further virtual object for inspection, optional adjustments, and/or approval. Thus, the update/upgrade can propagates to other virtual objects that use instances of the platonic object (163).

Access control parameters of a provenance node (171) may identify a license (176) for the respective object (151), and/or a price (177) of the respective object (151). Since the tree of provenance nodes in objects (153, 155, . . . , 157, 161, . . .) involved, directly or indirectly, in the blueprint of the respective object (151) identifies the prices and creators of the objects (153, 155, . . . , 157, 161, . . .) involved, the server computer/system (103) can automatically distribute the revenue generated from an instance of the respective object (151) to the respective creators according to the respective prices identified in the tree, to acquire the instances of objects (153, 155, . . . , 157, 161, . . .) involved in the blueprint of the respective object (151).

Publication

The server system (103) of FIG. 1 allows the users of the client devices (107, . . . , 109) to create user contents (e.g., virtual object (129)) that are visible and/or accessible in the virtual world. Once the virtual objects (e.g., 129) are published by their creators (e.g., the user of the account (137)), other users may see the virtual objects (e.g., 129) in the virtual world, interact with the virtual objects (e.g., 129), acquire replicas of the virtual objects (e.g., 129), and/or use the virtual objects (e.g., 129) as components to build new virtual objects.

Some of the techniques disclosed herein reduce the time period from the creation of the objects (e.g., 129) to their publication and/or eliminate or reduce the risks of the virtual objects that may cause undesirable disturbances in the virtual world hosted on the server system (103).

Before the publication of user content (e.g., a virtual object (129)) in the virtual world hosted on the server system (103), the user content may or may not be visible to other users of the virtual world. However, before its publication, the virtual object (e.g., 129) under construction as the user content is not acquirable by other users. Users other than its creators are not allowed to interact with the virtual object (e.g., 129) under construction. Preferably, before the publication of the virtual object (129), the virtual object (129) under construction is not executed as part of the virtual world and used to enhance or enrich the virtual world represented by the world model (131).

Preferably, before the publication of a virtual object (129), the virtual object (129) is inspected to ensure that it imposes no security threat to the server system (103) and/or to a client device (107) that may access and/or interact with the virtual object (129). Further, the virtual object (129) is inspected to ensure that its inclusion in the virtual world (and its potential replicas) does not significantly degrade the performance of the server system (103) and/or does not waste resources of the server system (103).

For example, images used as resources of the virtual objects (e.g., 129) might have computer viruses that can be a security threat to some of the client devices (107, . . . , 109) when the images are used on the client devices (107, . . . , 109) for the presentation of the virtual objects (e.g., 129).

For example, virtual objects (e.g., 129) may contain unsafe scripts that make bad system calls and can post a threat to the server system (103). A system call from the virtual object (129) requests the operating system of the server system (103) to perform a service as requested by the system call using a set of parameters provided the virtual object (129) at the time of the system call. Such service requests may exceed the privilege of the virtual object (129) and/or cause performance degradation.

For example, virtual objects (e.g., 129) may contain buggy or malicious scripts that waste system resources (e.g., in the form of excessive memory usage and/or processing power usage), which can significantly degrade the performance of the server system (103).

The server system (103) performs checks and simulations of the virtual object (129) before its publication in the virtual world. Preferably, the checks and simulations are performed while the virtual object (129) is under construction by its creator (e.g., the user of the user account (137)).

For example, during the construction of the object (129) on the server system (103) by the user of the user account (137), the user gathers, uploads, and creates components of the object (129) over a period of time, then assembles the components into the object (129), tests the object (129), and tweaks the configuration and/or behavior of the object (129). Preferably, the server system (103) performs the vetting and simulation of the components of the object (129) separately and the object as a whole, substantially in parallel with the construction process of the object. For example, when additional pieces or components of the virtual object (129) are identified, uploaded, and/or created, the server system (103) automatically vetting and/or simulating the executions of the components, while the user is working on the creation, adjustment, improvements of other pieces or components, or the overall assembly. Thus, after the user completes the construction/creation of the object (129), the time delay between the user/creator of the object (129) requesting for publication of the object (129) and the server system (103) approving the publication of the object (129) and rendering the object (129) as part of the virtual world can be reduced or minimized.

In some instances, a review of the object (129) by a human operator is performed before the publication of the object (129) in the virtual world. In other instances, the server system (103) performs the automated vetting and simulation and approves the publication with a review by a human operator. In both situations, the vetting by the server system (103) performed in parallel with or concurrently with the development/construction of the object (129) reduces the time delay to publication and can provide valuable feedback to the creator of the object (129) to improve its creation with better performance and less risk.

Figure 7:
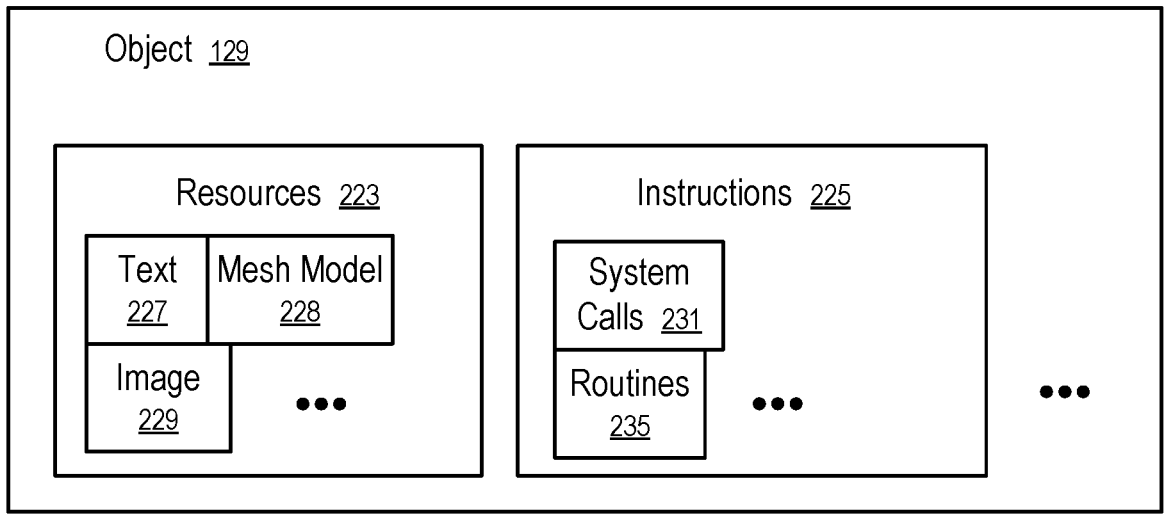
FIG. 7 illustrates a virtual object according to one embodiment.

FIG. 7 illustrates a virtual object according to one embodiment. For example, the virtual object (129) of FIG. 7 can be created by a user of the user account (137) in a computer system hosting a virtual reality world in a way as illustrated in FIG. 1.

FIG. 7 illustrates some examples of components (223) and instructions (225) of the virtual object (129), such as text (227), mesh model (228), image (229), . . . , system calls (231), routines (235), etc. In some instances, the instructions (225) are programmed using a scripting language, such as C#, Python, Perl, etc. In some instances, some of the resources of an object (e.g., 151) are provided by one or more published component objects (e.g., 153, 155, . . . , 157) and other resources are created specifically for the object (e.g., 151).

In general, a virtual object may have more or less types of resources than those illustrated in FIG. 7 for the virtual object (129). Thus, it is not necessary that each virtual object created in the virtual world have the same types of the resources illustrated in FIG. 7.

Different types of components (e.g., resources (223) and instructions (225)) have different types of concerns. For example, the text (227) may include offensive languages that may be inappropriate for the virtual reality world. For example, the image (229) may include computer virus and/or malware that can be a security threat to client devices (107, . . . , 109) and/or the server system (103). For example, the mesh model (228) may be excessive in resolution and thus require excessive memory and/or computing power in rendering the object (129) in the virtual world.

Instructions (225) of the virtual object (129) can be programmed to provide dynamic content and/or user interaction. However, instructions (225) programmed in certain ways may have undesirable behaviors. For example, the instructions may include system calls (231) that are blacklisted or restricted. For example, the system calls (231) performed by the object (129) have a suspicious or wasteful pattern. For example, the routines (235) may be programmed to consume excessive memory and/or processing powers of the server system (103).

The server system (103) of one embodiment automatically inspects the resources, detects and/or mitigates threats, and evaluates the virtual objects (129) for publication.

For example, the server system (103) evaluates the mesh model (228), determine whether the memory/processing requirements of the mesh model (228) is above a threshold, and automatically down-sampling the mesh model (228) having excessive resolution to generate a replacement mesh model.

For example, the server system (103) scans the instructions (225) to detect blacklisted and/or restricted system calls.

Figure 8:
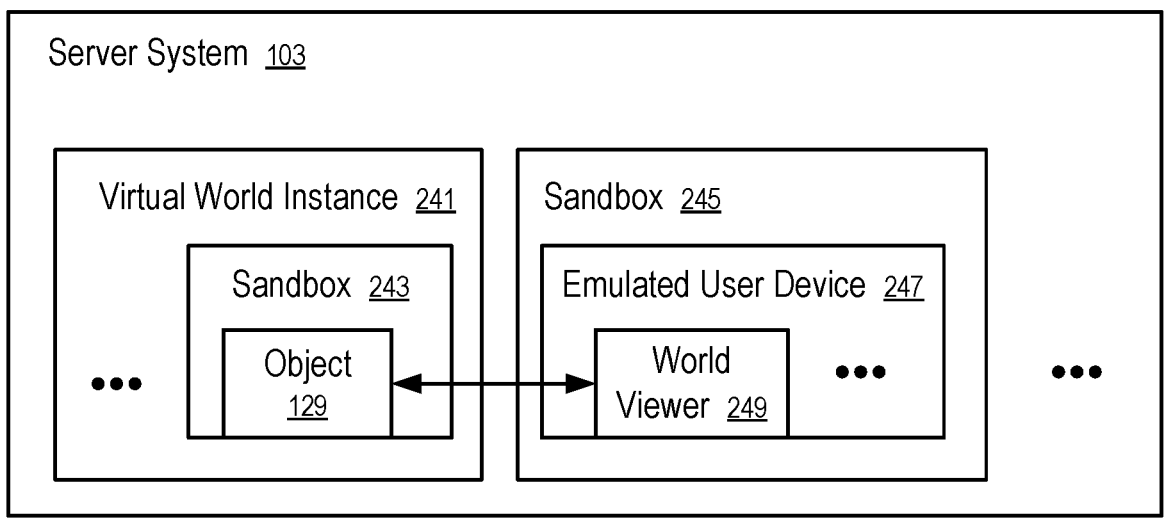
FIG. 8 shows a server system running a simulation to assess a virtual object according to one embodiment.

For example, the server system (103) performs a simulation of the virtual object (129) in the virtual world accessed by a user device, in a way as illustrated in FIG. 8, to determine whether the virtual object (129) has undesirable behavior and/or threats.

For example, the server system (103) scans images (e.g., 229) for computer virus and malware. For example, the server system (103) may open an image (229) in a sandbox, and recapture the image as rendered in the sandbox to generate a standardized, sanitized version of the image that is free of computer virus and malware.

In computer security, a sandbox is a security mechanism that tightly controls a set of resources available for running an untested or untrusted program or code such that the risk of harming the host computer system is reduced or eliminated. The sandbox can be implemented via the virtualization of a computing environment that virtually separates the running instance of the program or code under test from other computing activities of the host computer.

FIG. 8 shows a server system running a simulation to assess a virtual object according to one embodiment. For example, the server system of FIG. 8 can be used to implement the simulation of the virtual object of FIG. 7 in the computer system of FIG. 1.

In FIG. 8, the server system (103) renders an instance (241) of a virtual world according to the world model (131) of FIG. 1. To simulate the virtual object (129), a sandbox (243) is created to render the virtual object (129). The sandbox (243) provides a safe computing environment for the rendering of the virtual object (129) such that the threats and impacts of the virtual object (129) are contained within the sandbox (243). For example, the sandbox (243) captures all interactions of the object (129) with the server system (103), including the system calls (231), and exports safe outputs to the virtual world instance (241). Thus, at worst the virtual object (129) uses the maximum resources provided by the sandbox (243) without significantly impacting the performance of the virtual world instance (241) that is currently rendering the views of the virtual world for the users of the client devices (107, . . . , 109).

In FIG. 8, the server system (103) also provides a sandbox (245) to run an emulated user device (247). The emulated user device (247) simulates a typical user device (e.g., 107, . . . , 109) in accessing the virtual object (129) using a world viewer (249). The virtual object (129) as seen and interacted with by an avatar having a view point of the virtual world instance (241) is presented in the world viewer (249).

Preferably, the sandboxes (241 and 245) monitor the patterns of activities of the virtual object (129) to evaluate the suitability of the virtual object (129) for publication, such as the processing power consumption, memory resource consumption, system calls, computer virus/malware activities, etc. After the simulation test, the virtual object (129) may be approved for publication and integration in the virtual reality world.

In some instances, the server system (103) provides random inputs to the world viewer (249) for interaction with the virtual object (129) that is rendered in the sandbox (243). Thus, the behavior of the virtual object (129) is examined in a simulated user interaction environment with the instructions (225) of the virtual object (129) being fully exercised.

Optionally, the simulation test and/or results of the test are presented to a human operator for inspection and/or for publication approval.

Figure 9:
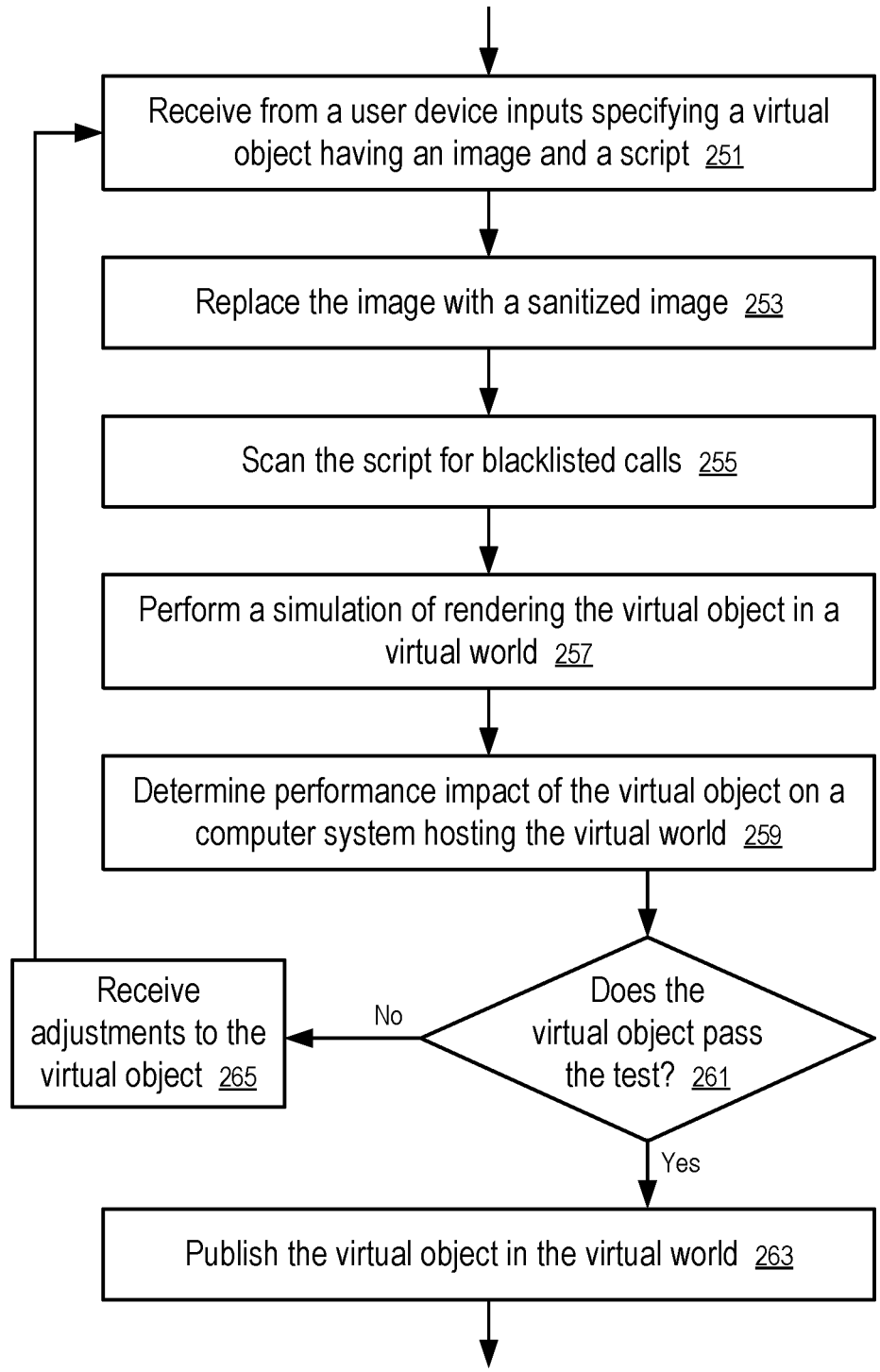
FIG. 9 shows a method to publish a virtual object in a virtual world according to one embodiment.

FIG. 9 shows a method to publish a virtual object in a virtual world according to one embodiment. For example, the method of FIG. 9 can be implemented in a server system (103) illustrated in FIG. 8 to publish the virtual object (129) illustrated in FIG. 7.

In FIG. 9, a computer system (e.g., as illustrated in FIG. 1) receives (251) from a user device (e.g., 107 or 109) inputs specifying a virtual object (129) having an image (229) and a script (e.g., instructions (225). In response, the computer system replaces (253) the image (229) with a sanitized image (e.g., by rendering the image (229) in a sandbox and recapturing the image (229) rendered in the sandbox as the sanitized image that is free of computer virus and malware). Further, the computer system scans (255) the script (e.g., instructions (225)) for blacklisted calls (e.g., calls to the operation system of the computer system) to detect potential security threats. The computer system performs (257) a simulation of rendering the virtual object in a virtual world (e.g., as illustrated in FIG. 8) and determines (259) performance impact of the virtual object (129) on the computer system hosting the virtual world.

In some instances, the virtual object (129) includes a mesh model (228) that defines the shape of the virtual object (129); and the image (229) defines the appearance/texture of a surface of the virtual object (129). The computer system may optionally evaluate the resolution of the mesh model (228) to balance computing performance and rendering effect. For example, when the resolution of the mesh model (228) is excessive, the computer system may generate an automatically downsampled replacement mesh model to improve performance.

In some instances, the computer system scans the text (227) of the virtual object to identify potentially offensive languages for the virtual world.

In FIG. 9, the computer system determines (261) whether the virtual object (129) passes the test based on the performance impact determined (259) from the simulation (257). If the virtual object (129) fails the test, the creator of the virtual object (129) may be prompted to modify or adjust the virtual object (129) for publication. After receiving (265)

adjustments to the virtual object (129), at least some of the operations (251 to 259) may be repeated.

For example, if the image (229) is not adjusted, the operation of replacing (253) the image with a sanitized image can be skipped.

For example, if the script (e.g., instructions (225)) is not adjusted, the operation of scanning (255) the script for blacklisted calls can be skipped.

After the virtual object (129) passes (261) the test, the computer system publishes (263) the virtual object (129) in the virtual world hosted on the computer system, such that the virtual object (129) becomes a part of the virtual world.

After the publication of the virtual object (129) in the virtual world, users other than the creator of the virtual object (129) may access the virtual object (129) and/or acquire replicas of it. The access to the virtual object (129) and its components can be controlled using the technique of platonic object (163) and provenance node (171) illustrated in FIGS. 2-6.

Figure 10:
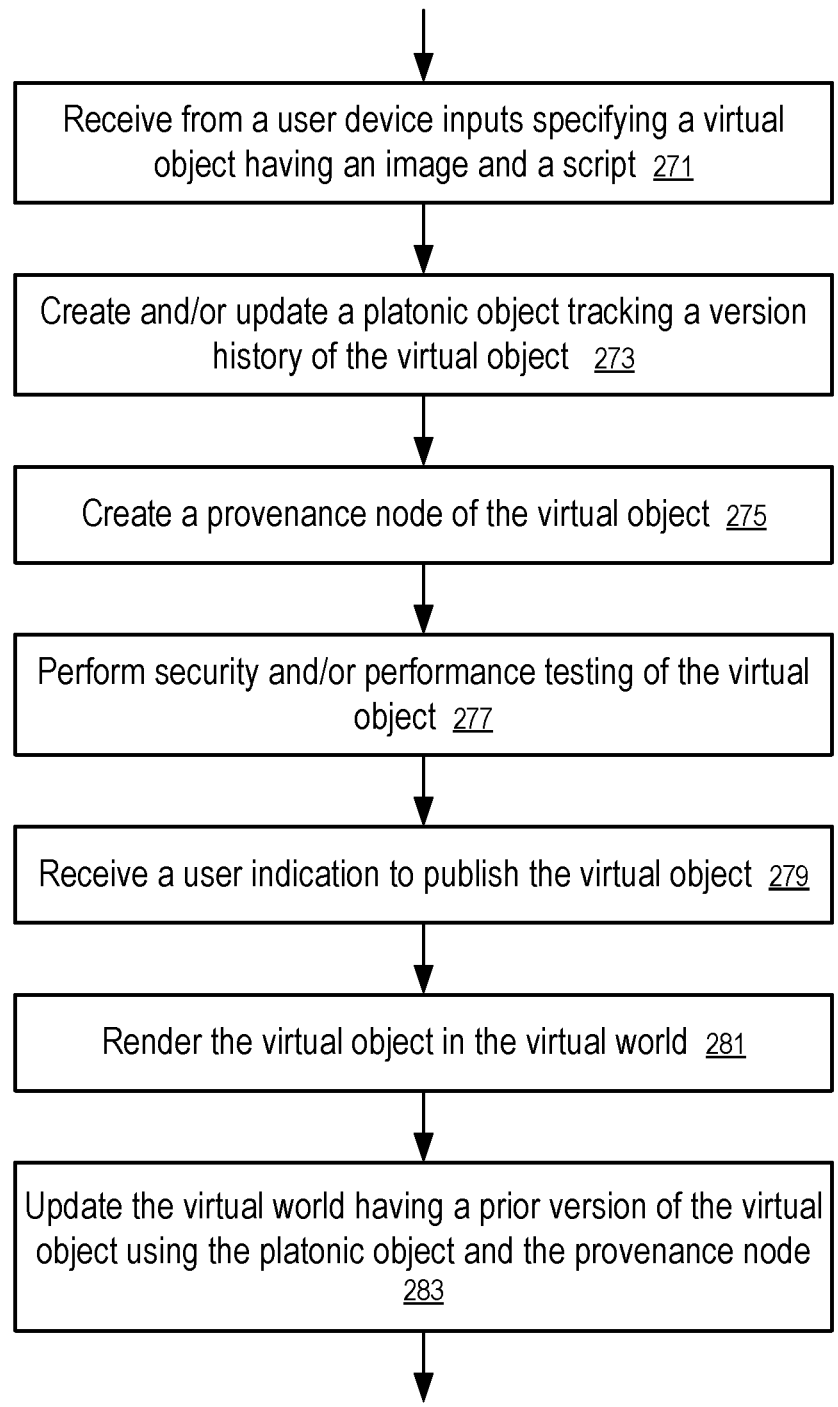
FIG. 10 shows a method to update a virtual world using user content according to one embodiment.

FIG. 10 shows a method to update a virtual world using user content according to one embodiment. For example, the method of FIG. 10 can be implemented in a server system (103) illustrated in FIG. 8 to test the virtual object (129) illustrated in FIG. 7.

In FIG. 10, a computer system receives (271) from a user device (e.g., 107, . . . , 109) inputs specifying a virtual object (129) having an image (229), a script (e.g. instructions (225)), and/or other resources (223), such as a mesh model (228). In response, the computer system creates and/or updates (273) a platonic object (163) tracking a version history of the virtual object (129). Further, the computer system creates (275) a provenance node (17) of the virtual object (129) (e.g., illustrated in FIG. 4). The platonic object (163) links provenance nodes of different versions of the virtual object (129) and their component objects in a way illustrated in FIG. 5 to specify access control.

In FIG. 10, the computer system performs (277) security and/or performance testing of the virtual object (129) (e.g., in a way as illustrated in FIG. 9). Preferably, the process of the security and/or performance testing is automatically scheduled in parallel to the addition or completion of the resources (223) and/or routines (235) added for the virtual object (129). Upon the completion of the construction/creation of the virtual object (129), the virtual object (129) as a whole is simulated and tested in a way as illustrated in FIG. 8.

After the security and/or performance testing (277), when the computer system receives (279) a user indication to publish the virtual object (129), the computer system renders (281) the virtual object in the virtual world and updates (283) the virtual world having a prior version of the virtual object in accordance with the platonic object (163) and the provenance node (171).

For example, access to the virtual object (129) and its component objects can be controlled using the method of FIG. 6.

For example, the computer system as illustrated in FIG. 1 includes a data storage device (105) and a server system (103). The data storage device (105) stores a three-dimensional model (131) of a virtual reality world and avatar models (135) representing residences of the virtual reality world. The server system (103) is configured (e.g., via software instructions running on computing hardware) to render the virtual reality world according to the three-dimensional model (131) and the viewpoints of avatars rendered according to the avatar models (135) (e.g., a viewpoint as defined by the location (143) and orientation (145) of an avatar (147) in the virtual reality world).

The server system (103) is further configured to: receive, from a user device (e.g., 107 or 109), user inputs to create a virtual object (129) in the virtual reality world, where the virtual object (129) has a plurality of components, such as a mesh model (228) defining the shape of the virtual object (129), an image (229) specifying the surface declaration of the virtual object (129), and a script or a set of instructions (225) defining the run time behavior of the virtual object (129).

The server system (103) examines the components of the virtual object (129) to detect security threats and performance concerns and simulates the rendering of the virtual object (129) in the virtual reality world, before the publication of the virtual object (129) in the virtual reality world. The server system (103) approves the publication of the virtual object (129) in the virtual reality world based on a result of the examination of the components of the virtual object (129) and the simulation of the rendering of the virtual object (129).

Preferably, at least part of the examination of the components and the simulation of the rendering of the virtual object (129) is performed concurrently with the creation process of the virtual object (129) by a user of the virtual reality world. For example, the server system (103) may schedule and/or conduct, in response to the user inputs and during creation of the virtual object by a user, the examination of the components of the virtual object (129) such that the examination is performed and/or completed before the completion of the creation of the virtual object (129). Thus, the delay in the publication of the virtual object (129) in the virtual reality world is reduced or minimized.

Preferably, before the publication of the virtual object (129), the virtual object (129) is not visible in the virtual reality world to users/avatars other than the creator of the virtual object (129); and after the publication of the virtual object (129), replicas of the virtual object (129) are acquirable by users/avatars in the virtual world according to the access control parameters specified in the provenance node(s). The users/avatars may interact with the virtual object (129) and/or its replicas, and use them to create new objects that upon publication become part of the virtual reality world.

For example, the components of the virtual object (129) may include an image (229); and the server system (103) scans the image (229) for computer virus and malware during the component examination of the image (229). Alternatively or in combination, the server system (103) renders the image (229) in a sandbox (243), captures a replacement image from the rendering of the image (229), and replaces the image (229) of the virtual object (129) with the replacement image that is free of virus and malware. Preferably, the resolution of the replacement image is configured to improve perform performance of rendering the virtual object in the virtual reality world (in comparison with the initial/original image (229) of the virtual object).

For example, the components of the virtual object (129) may include a script or a set of instructions (225); and the server system (103) scans the script or instructions (225) for blacklisted system calls (231) during the component examination of the virtual object (129).

For example, the components of the virtual object (129) may include a mesh model (228) defining a shape of the virtual object (129) in the virtual reality world; and during the component examination of the virtual object (129), the server system (103) measures a performance impact of rendering the mesh model (228) (e.g., whether the resolution of the mesh model is excessive in memory consumption and processing power consumption). When the resolution is excessive, the server system (103) automatically down-samples the mesh model (228) to generate a replacement mesh model that has a better rendering performance than the initial/original mesh model (228) that is being replaced.

During the simulation of the rendering of the virtual object (129) in the virtual reality world, the server system (103) renders the virtual object (129) in a sandbox (243) and measures computer resource usages of the virtual object (129) (e.g., memory, processing power, and/or, communication bandwidth used by the virtual object (129)). The approval of the publication of the virtual object (129) in the virtual reality world is based at least in part on a determination that the computer resource usages measured during the simulation are below respective predetermined thresholds. Further, the server system (103) monitors the simulation to detect potential security threats from the execution of the instructions (225) of the object (129).

Optionally, the server system (103) also hosts an emulated user device (247) and runs running a world viewer (249) in the emulated user device (247) to access the virtual object (129) that is being simulated in the virtual reality world (e.g., within the sandbox (243)). The server system (103) may generate inputs (e.g., randomly, or according to programmed patterns) to the world viewer to simulate user interaction with the virtual object (129) in the virtual reality world and to fully exercise the instructions (225) of the virtual object (129). When the behavior of the simulated rendering of the virtual object (129) in the virtual world is accepted, the virtual object (129) can be approved for publication.

Figure 11:
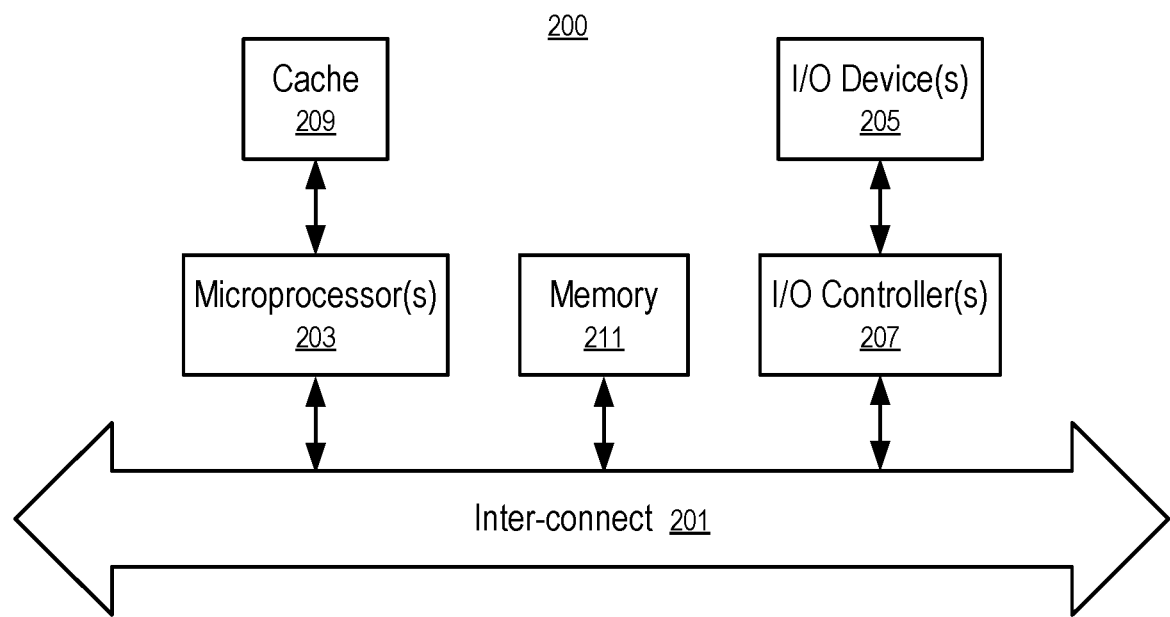
FIG. 11 shows a data processing system on which the methods of the present disclosure can be implemented.

Each of the client devices (107, . . . , 109) and the server system (103) can be implemented in the form of one or more data processing systems illustrated in FIG. 11, with more or fewer components.

The present disclosure includes the methods discussed above, computing apparatuses configured to perform methods, and computer storage media storing instructions which when executed on the computing apparatuses causes the computing apparatuses to perform the methods.

FIG. 11 shows a data processing system on which the methods of the present disclosure can be implemented. While FIG. 11 illustrates various components of a computer system, it is not intended to represent any particular architecture or manner of interconnecting the components. Other systems that have fewer or more components than those shown in FIG. 11 can also be used.

In FIG. 11, the data processing system (200) includes an inter-connect (201) (e.g., bus and system core logic), which interconnects a microprocessor(s) (203) and memory (211). The microprocessor (203) is coupled to cache memory (209) in the example of FIG. 11.

In FIG. 11, the inter-connect (201) interconnects the microprocessor(s) (203) and the memory (211) together and also interconnects them to input/output (I/O) device(s) (205) via I/O controller(s) (207). I/O devices (205) may include a display device and/or peripheral devices, such as mice, keyboards, modems, network interfaces, printers, scanners, video cameras and other devices known in the art. When the data processing system is a server system, some of the I/O devices (205), such as printers, scanners, mice, and/or keyboards, are optional.

The inter-connect (201) includes one or more buses connected to one another through various bridges, controllers and/or adapters. For example, the I/O controllers (207) include a USB (Universal Serial Bus) adapter for controlling USB peripherals, and/or an IEEE-1394 bus adapter for controlling IEEE-1394 peripherals.

The memory (211) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing system comprising:
 a data storage device configured to store:
  a three-dimensional model; and
  an avatar model; and
 a server computer configured to:
  receive, from a user device, user inputs to create a virtual object, the virtual object having a plurality of components;
  detect security threats and performance concerns by simulating rendering of the virtual object; and
  approve publication of the virtual object based at least in part on a result of simulating the rendering of the virtual object.

2. The computing system of claim 1, wherein the server computer is further configured to detect security threats and performance concerns by examining the components of the virtual object.

3. The computing system of claim 2, wherein the server computer is further configured to render a virtual reality world according to the three-dimensional model and according to view points of avatars rendered in the virtual reality world according to the avatar models.

4. The computing system of claim 2, wherein at least part of examination of the components and simulation of the rendering of the virtual object is performed concurrently with a creation process of the virtual object by a user of a virtual reality world.

5. The computing system of claim 4, wherein the components of the virtual object include an image.

6. The computing system of claim 5, wherein the examination of the components of the virtual object includes scanning the image for computer virus and malware.

7. The computing system of claim 5, wherein the server computer is further configured to:
 render the image in a sandbox;
 capture a replacement image from the image rendered in the sandbox; and
 replace the image of the virtual object with the replacement image.

8. The computing system of claim 7, wherein a resolution of the replacement image is configured to improve performance of rendering the virtual object in the virtual reality world.

9. The computing system of claim 4, wherein the components of the virtual object include a script; and the server computer is further configured to scan the script for blacklisted system calls.

10. The computing system of claim 4, wherein the components of the virtual object include a mesh model defining a shape of the virtual object in the virtual reality world; and the server computer is further configured to measure a performance impact of rendering the mesh model.

11. The computing system of claim 4, wherein the components of the virtual object include a mesh model defining a shape of the virtual object in the virtual reality world; and the server computer is further configured to downsample the mesh model to generate a replacement mesh model.

12. A method comprising:
receiving, in a server computer, user inputs to create a virtual object, the virtual object having a plurality of components;
detecting, by the server computer, security threats and performance concerns by examining the components of the virtual object or simulating rendering of the virtual object; and
approving publication of the virtual object based on a result of the detecting of security threats and performance concerns.

13. The method of claim 12, further comprising:
measuring computer resource usages of the virtual object during the simulating of the rendering of the virtual object.

14. The method of claim 13, wherein the approving of the publication of the virtual object in a virtual reality world is based at least in part on a determination that the computer resource usages measured during the simulating are below respective predetermined thresholds.

15. The method of claim 13, further comprising:
hosting an emulated user device in the server computer; and
running a world viewer in the emulated user device to access the virtual object being simulated in a virtual reality world.

16. The method of claim 15, further comprising:
generating, by the server computer, inputs to the world viewer to simulate user interaction with the virtual object in the virtual reality world.

17. The method of claim 16, wherein the simulating of the rendering of the virtual object is performed in a sandbox.

18. A non-transitory computer storage medium storing instructions configured to instruct a server computer, the method comprising:
receiving, in the server computer, user inputs to create a virtual object, the virtual object having a plurality of components;
detecting, by the server computer, security threats and performance concerns by examining the components of the virtual object or simulating rendering of the virtual object; and
approving publication of the virtual object based on a result of the detecting of security threats and performance concerns.

19. The non-transitory computer storage medium of claim 18, wherein the method further comprises:
scheduling, by the server computer in response to the user inputs and during creation of the virtual object by a user, the examining of the components of the virtual object to be performed before completion of the creation of the virtual object.

20. The non-transitory computer storage medium of claim 18, wherein before the publication of the virtual object, the virtual object is not visible in a virtual reality world to users other than a creator of the virtual object; and after the publication of the virtual object, replicas of the virtual object are acquirable by users in the virtual reality world.

* * * * *